(12) United States Patent
Muller et al.

(10) Patent No.: US 9,984,373 B2
(45) Date of Patent: *May 29, 2018

(54) NEGOTIABLE INFORMATION ACCESS IN ELECTRONIC SOCIAL NETWORKS

(75) Inventors: Samuel Muller, Zurich (CH); Dieter M. Sommer, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 538 days.

This patent is subject to a terminal disclaimer.

(21) Appl. No.: 13/565,963

(22) Filed: Aug. 3, 2012

(65) Prior Publication Data

US 2012/0297003 A1    Nov. 22, 2012

Related U.S. Application Data

(62) Division of application No. 12/417,207, filed on Apr. 2, 2009, now Pat. No. 9,626,681.

(51) Int. Cl.
| | |
|---|---|
| *G06Q 30/02* | (2012.01) |
| *G06Q 10/10* | (2012.01) |
| *G06Q 30/00* | (2012.01) |
| *G06Q 50/18* | (2012.01) |
| *H04L 12/58* | (2006.01) |
| *G06Q 50/00* | (2012.01) |

(52) U.S. Cl.
CPC .......... *G06Q 30/00* (2013.01); *G06Q 50/188* (2013.01); *H04L 51/32* (2013.01); *H04L 51/34* (2013.01); *G06Q 30/02* (2013.01); *G06Q 50/01* (2013.01)

(58) Field of Classification Search
CPC .................................................. G06Q 50/01
USPC ................................................... 705/1.1–912
See application file for complete search history.

(56) References Cited

U.S. PATENT DOCUMENTS

| | | | |
|---|---|---|---|
| 5,504,837 A | 4/1996 | Griffeth et al. | |
| 6,581,059 B1 * | 6/2003 | Barrett | G06F 21/6245 |
| 7,103,580 B1 * | 9/2006 | Batachia | G06Q 20/40 |
| | | | 705/1.1 |
| 7,120,695 B2 * | 10/2006 | Nilsson | H04L 29/06 |
| | | | 709/203 |
| 7,216,144 B1 * | 5/2007 | Morris | H04L 12/1818 |
| | | | 709/204 |
| 7,340,438 B2 * | 3/2008 | Nordman et al. | 705/64 |

(Continued)

*Primary Examiner* — Jonathan P Ouellette
(74) *Attorney, Agent, or Firm* — Cantor Colburn LLP; Daniel Morris

(57) ABSTRACT

A method for implementing an electronically-based negotiation session between users within an ESN. The method includes sending a message including a request portion and a response portion from a first user to a second user in a round of successive rounds, and in response to receiving the message from the first user, sending a message from the second user to the first user in a subsequent round, the message from the second user including a response portion responsive to the request portion of the message from the first user and a request portion. When a new round is performed, evaluating whether an agreement exists by checking messages previously exchanged, and exchanging subsequent messages, when any rounds remain and the session has not been terminated, and granting access and exchanging data between the users, executing actions, and setting policies as negotiated, when the session has been terminated and an agreement exists.

12 Claims, 3 Drawing Sheets

(56) References Cited

U.S. PATENT DOCUMENTS

| | | |
|---|---|---|
| 7,587,501 B2 | 9/2009 | Stillion et al. |
| 7,602,723 B2 * | 10/2009 | Mandato et al. ............. 370/236 |
| 7,814,438 B2 * | 10/2010 | Grossman .............. G06Q 10/10 715/752 |
| 8,001,053 B2 | 8/2011 | Nguyen et al. |
| 8,464,313 B2 * | 6/2013 | Stollman ............... G06F 21/606 713/155 |
| 8,612,359 B2 * | 12/2013 | Hull et al. .................... 705/319 |
| 2004/0028210 A1 * | 2/2004 | Duncan ................... H04M 3/51 379/265.01 |
| 2004/0138983 A1 * | 7/2004 | Nishimaki ............. G06Q 40/02 705/36 R |
| 2006/0041436 A1 * | 2/2006 | Brodie ................... G06Q 10/10 726/4 |

* cited by examiner

NEGOTIABLE INFORMATION ACCESS IN ELECTRONIC SOCIAL NETWORKS

CROSS-REFERENCES TO RELATED APPLICATION

This application is a divisional of U.S. application Ser. No. 12/417,207 filed Apr. 2, 2009 the disclosure of which is incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to the field of computers and, in particular, to methods, hardware products, and computer program products for implementing electronically based negotiation sessions for providing information access in electronic social networks.

2. Description of Background

Electronic social networks (ESNs) represent a multi-billion dollar market. This is manifested by their increasing popularity and rapidly growing user base throughout the world. In spite of this, ESNs still suffer from a multitude of technological problems which, from a general perspective, result in an inadequate electronic representation of real-world social relationships. This hinders an even larger-scale adoption of ESNs and diminishes the value that individual users are able to extract from ESNs.

One problem with existing ESNs is that users cannot flexibly define the visibility of their profile information to other users in an efficient yet fully user-controlled way. In particular, users cannot reciprocally react to the amount and type of profile information their contacts are willing to share. As a result, while some users openly (but not always knowingly) share a lot of profile information with their contacts, these contacts may only share a limited amount of profile information in return.

SUMMARY

According to an embodiment of the present invention, a computer-executable method for implementing an electronically based negotiation session between a first user and a second user to provide information access in an electronic social network (ESN) is disclosed. The negotiation session includes a series of k successive rounds, k being a positive integer greater than one. The method includes sending a message including a request portion and a response portion from a first user to a second user in a round of the k successive rounds, in response to receiving the message from the first user, sending a message from the second user to the first user in a subsequent round of the k successive rounds, the message from the second user including a response portion responsive to the request portion of the message from the first user and a request portion, when a new round of the negotiation session is performed, evaluating whether an agreement exists by checking whether messages previously exchanged satisfy a termination condition, exchanging, one or more subsequent messages, when any rounds of the k successive rounds remain and the negotiation session has not been terminated, each subsequent message comprising a request part and response part by commencing with a subsequent message being sent in a direction opposite that of an immediately preceding message between the first and second users, and granting access and exchanging data between the first and second users, executing actions, and setting policies as negotiated during the negotiation session when the negotiation session has been terminated and an agreement exists.

Hardware products and computer program products corresponding to the above-summarized methods are also described and claimed herein. Other hardware products, methods, and/or computer program products according to embodiments will be or become apparent to one with skill in the art upon review of the following drawings and detailed description. It is intended that all such additional hardware products, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

As a preliminary matter, some notation and basic concepts will be defined. An ESN comprises a set of attributes $A=\{a_1, a_2, a_3, \ldots\}$ and a set of users $U=\{u_1, u_2, u_3, \ldots\}$. A relationship between a first user u and a second user v where $u, v \in U$ is modeled as a tuple $(u, v)$ in a relation $O \subseteq U \times U$. An attribute $a \in A$ associated with a user such as first user u or second user v has an ontology type and a value. For example, given an attribute $a_1=$(lastname, "Doe"), '$a_1$' identifies the attribute, 'lastname' is the ontology type, and 'Doe' is the value of the attribute. According to an embodiment of the present invention, additional ontology types include first name, last name, job, nationality, and salary, for example. A user profile Iu of a user u consists of the union of the set of attributes Au of u, where Au⊆A, and the set Uu of contacts of user u, where Uu⊆U. Iuv is used to denote a set of profile information of u that the second user v can access. For purposes of the discussion herein, let u, v∈U be two ESN users in a relationship (u, v)∈O.

Figure 1:
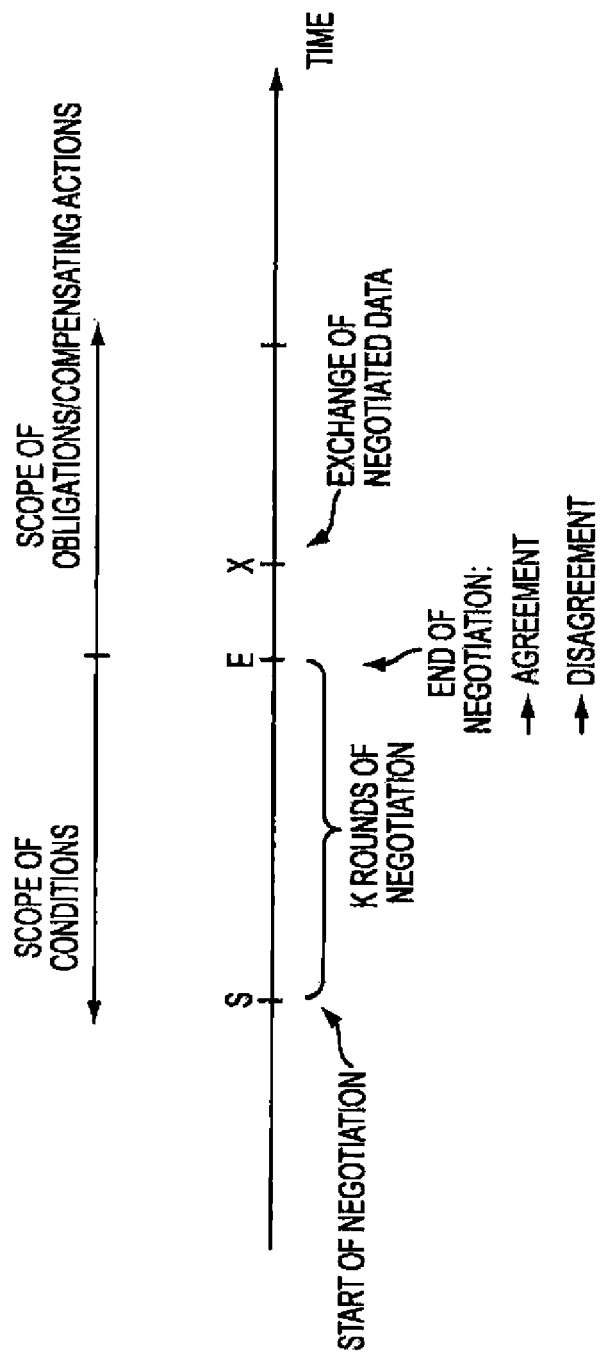
FIG. 1 is a timeline illustrating an exemplary method for implementing an electronically based negotiation session between a first user and a second user to provide information access in an electronic social network (ESN).

FIG. 1 is a timeline illustrating an exemplary method for implementing an electronically based negotiation session between a first user and a second user to provide information access in an electronic social network (ESN). At any point in time, such as at point S, either the first user u or the second user v can start a negotiation over the amount and types of mutually accessible profile information or a type of mutually accessible profile information or both. According to an embodiment of the present invention, the information access which is the subject of the negotiation may be fair in that the access to information granted is balanced between the first and second users as a result of the negotiation. The first user u initiates the negotiation by running a first round of a message exchange protocol described hereinafter with reference to FIG. 2. This first round is special in that the first user u has not received a message from the second user v before. Returning to FIG. 1, at most k−1 rounds of negotiation follow with first user u and second user v alternating in being responsible for initiating each successive round. This is diagrammatically represented in FIG. 1 as a region on the timeline between point S and point E. The constant k is a positive integer greater than one, and may be defined, for example, as a system default or by one or more of the users u or v.

After l rounds of negotiation have been completed, where 0<l≤k, the electronically based negotiation session ends at point X with either an agreement or a disagreement between the first user u and the second user v. Upon agreement, both users u and v are bound to fulfill the obligations associated with this agreement or, in case of non-fulfillment, one or more respective compensation actions are applied pursuant to the agreement. After the agreement, u can access the profile information $I_{vu}$ of v under the terms of their negotiated agreement, and vice versa for v. Typically, this involves an exchange of negotiated information between u and v. The information becomes accessible (exchange); as the ESN profiles are hosted on the ESN server, the users would then be able to access the additional information as agreed during the session.

Figure 2:
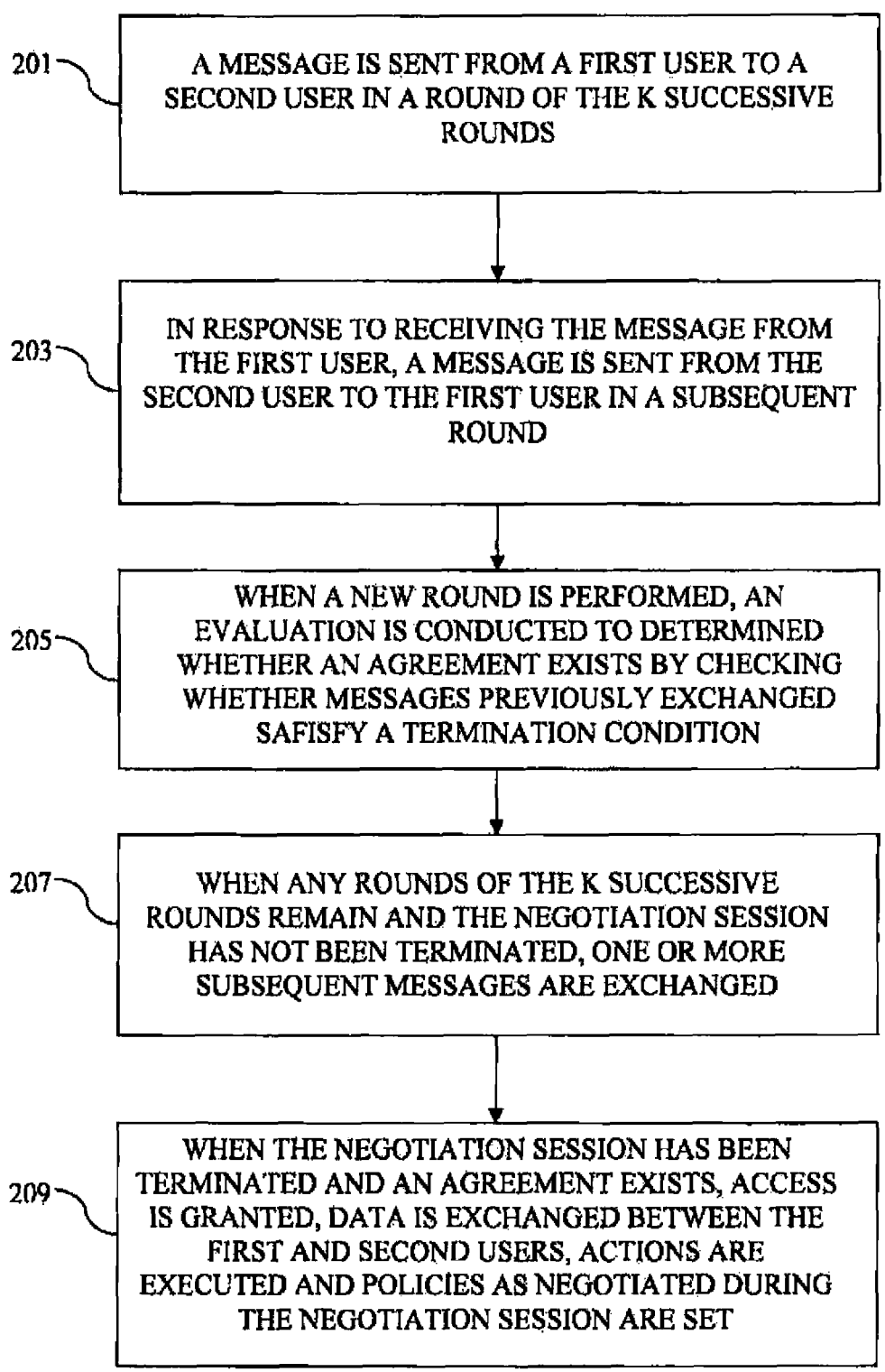
FIG. 2 is a flowchart illustrating the exemplary method of FIG. 1 for implementing an electronically based negotiation session between a first user and a second user to provide information access in an ESN.

FIG. 2 is a flowchart further illustrating the exemplary method of FIG. 1 for implementing an electronically based negotiation session between a first user and a second user to provide information access in an ESN. The session includes a series of k successive rounds, k being a positive integer greater than one. The procedure of FIG. 2 commences at block 201 where a message including a request portion is sent from a first user to a second user in a round of the k successive rounds. Next, at block 203, in response to receiving the message from the first user, a message is sent from the second user to the first user in a subsequent round, the message including a response portion responsive to the request portion of the message from the first user and a request portion.

The procedure progresses to block 205 where when a new round of the negotiation session is performed, an evaluation is conducted to determined whether an agreement exists by checking whether messages previously exchanged satisfy a termination condition. If any agreement exists (i.e., can be identified), then one or more terms characterizing the agreement are stored in a computer readable storage medium and the negotiation session is terminated at block 205 If any rounds of the k successive rounds remain and the negotiation session has not been terminated, one or more subsequent messages are exchanged between the first and second users at block 207. According to an embodiment of the present invention, each subsequent message includes a request portion and a response portion by commencing with a subsequent message being sent in a direction opposite that of an immediately preceding message between the first and second users. That is, if the immediately preceding message was sent from the first user to the second user, then the subsequent message is sent from the second user to the first user, and if the immediately preceding message was sent from the second user to the first user, then the subsequent message is sent from the first user to the second user.

From block 207, the process moves to block 209 where when the negotiation session has been terminated and an agreement exists, granting access and exchanging data between the first and second users, executing actions, and setting policies as negotiated during the negotiation session.

One key concept set forth in the procedure of FIG. 2 is negotiation. Generally speaking, a negotiation is characterized by a succession of at most k rounds, where in each round l≤k a message $M_1$ is sent from u to v or vice versa. The users alternate in being a sender of a message in each of the successive rounds. Without loss of generality, assume for purposes of the present discussion that user u is the initiator of a negotiation.

Message Format

A message $M_l$, such as any of the first, second, third, or fourth messages discussed previously, is a pair $(Rs_l, Rq_l)$, where: $Rs_l:=(T'_l,Q'_l,E'_l,C'_l,O'_l\ CA'_l$ and $Rq_l:=(T_l,Q_l,E_l,C_l,O_l, CA_l,TA_l)$.

$Rs_l$ the response part of the message $M_l$ and $Rq_l$ is the request part of the message $M_l$. The components of the response part and the request part will now be described, starting with the request part. It is assumed herein that v is the sender and u the recipient of $M_l$.

Request part. The request part $Rq_l$ of $M_l$ comprises the following elements:

$T_l$ is a possibly empty set of tuples (t, ap, up), where t is an ontology type, ap is a requested access control policy for t, and up denotes a usage control policy for an ontology type t for which v is requesting one or more attribute values from u. For example, v might specify a tuple (address, read, *) to indicate that v would like to get read access to an attribute of "ontology type address" of u with no restrictions on how he may use this information (indicated by *). Generally speaking, Tl contains a set of ontology types, each accompanied by a dedicated access control and a usage control policy. Note that both the access control policy and the usage control policy (also referred to as a data handling policy) can be specified in an arbitrary language defined by the ESN. Also note that v need not know the ontology types for which u really has attributes but v can e.g., simply pick a set of ontology types from an ontology offered by the ESN.

$Q_l$ is a (possibly empty) query that specifies a set of contacts of u which v requests from u. The query can be expressed in a sufficiently expressive query language. A prominent example for such a query language is SQL. The query is accompanied by a policy that specifies how the data of the contacts defined by the query are to be handled. The symbol c denotes the empty query, which is used if no query is included.

$E_l$ is a (possibly empty) query specifying credentials that are requested by v from u to be released by u in case of a successful termination of the negotiation. The concept of credentials is very general and encompasses things like the guarantee to receive an attribute value for a certain data type when the credential is shown to the ESN. As above, the query may be accompanied with a policy specifying the usage control requirements related to the credentials. Again, the symbol c denotes the empty query.

$C_l$ is a possibly empty set of conditions over R, A, U as required by u that v agrees to satisfy before a successful termination of the negotiation. Typically, these conditions specify certain criteria that v must satisfy, e.g., a minimum average rating of the 'trustworthiness' metric by all of his contacts.

$O_l$ is a possibly empty set of obligations v promises to u to fulfill once the negotiation has been successfully terminated.

$CA_l$ is a possibly empty set of compensation actions that v accepts to be executed if he fails to fulfill his obligations defined in $O_l$.

$TA_l$ is a possibly empty set of 'resulting actions. A resulting action is an action that may be executed by v in case the associated request is not accepted by u or, alternatively, in case the negotiation does not end in an agreement. As the name implies, the set $TA_l$ is not negotiable by u in the response part of the next message $M_{l+1}$ of u. A typical example for a resulting action would be the termination of the relationship.

Response part. The response part $Rs_l$ of $M_l$ is v's answer to the request part $Rq_{l-1}$ of an immediately preceding message $M_{l-1}$ sent by u.

$T'_l$ is a is a possibly empty set of tuples (t, ap, up), where t is an ontology type, ap is a requested access control policy for t, and up denotes a usage control policy for the ontology type t for which u requested the attribute values from v. Intuitively, $T'_l$ includes the set of types and the specific policies under which v is willing to allow u to access her attributes. The idea is that $T'_l$ is the response to the requested $T_{l-1}$ contained in the request part $Rq_{l-1}$ of message $M_{l-1}$ in round l-1. $T'_l$ can have $T_{l-1}$ as a subset, but need not. Typically it will be an extended subset of $T_{l-1}$.

$Q'_l$ is a possibly empty query specifying the contacts of v that user v is willing to release to u after a successful negotiation. Hence, $Q'_l$ is the response to $Q_{l-1}$.

$E'_l$ is a possibly empty query specifying the credentials that user v agrees to provide to u in case of a successful termination of the negotiation.

$C'_l$ is a possibly empty set of conditions over R, A, U as required by v that u must ensure before a successful termination of the negotiation. Typically, the conditions are used by v to ensure that u satisfies certain criteria, e.g., a minimum average rating of the 'trustworthiness' metric by all of his contacts.

$O'_l$ is a set of obligations that are imposed on u by v and have to be fulfilled by u once the negotiation has been successfully terminated.

$CA'_l$ refers to a set of compensation actions that apply to u in case u fails to fulfill the obligations $O'_l$.

The initiation of an electronic negotiation session at block 201 of FIG. 2 is a special case of a general negotiation round. As u has no previous message to respond to, the response part $Rs_1$ of the initial message $M_1$ is empty. An initial message is thus defined as $M_1:=(Rs_1,Rq_1)$, (1) where $Rs_1:=(\emptyset,\epsilon,\epsilon,\emptyset,\emptyset,\emptyset)$ and $Rq_1=(T,Q_1,E_1,C_1,O_1,CA_1,TA_1)$. Often, the initiator of a negotiation would not constrain himself voluntarily by proposing conditions, obligations, and compensation actions in this initial request. In this case, we have $C_1=\emptyset$, $O_1=\emptyset$, and $CA_1=\emptyset$. However, in certain cases, e.g., when two high-profile users connect their user profiles, already the initiator of a negotiation might propose certain conditions. For example, an initiating user might add the condition that the number of the user's own high-profile contacts exceeds a certain threshold. Thereby, he can signal the fact that he is an important person to connect to and worthy of certain mutual information exchange.

One Round of Negotiation

A detailed description of round l of the electronic negotiation process that may take place at any of blocks 203, 205 and 207 (FIG. 2) is now presented, where $0<l\le k$. As before we let user v be the one who receives a message $M_{l-1}$ from user u as input to round l and sends the message $M_l$. The input to round e of a negotiation is a message $M_{l-1}$, where $M_{l-1}:=(Rs_{l-1},Rq_{l-1})$, with $Rs_{l-1}:=(T'_{l-1},Q'_{l-1},E'_{l-1},C'_{l-1},O'_{l-1},CA'_{l-1})$ and $Rq_{l-1}:=(T_{l-1},Q_{l-1},E_{l-1},C_{l-1},O_{l-1},CA_{l-1},TA_{l-1})$.

Upon receiving the message $M_{l-1}$ from u as input to round l, user v composes a message $M_l$ that is then sent to u. The message $M_l$ consists of a response part responding to the previously received message $M_{l-1}$ and a request part that is a counter request. Concretely, message $M_l$ of round l is defined as $M_l:=(Rs_l,Rq_l)$ where $Rs_l:=(T'_l,Q'_l,E'_l,C'_l,O'_l,CA'_l)$ and $Rq_l:=(T_l,Q_l,E_l,C_l,O_l,CA_l,TA_l)$. The first tuple of message $M_l$ is a response to the previously received message from u and the second tuple of $M_l$ is a request targeted at u.

Termination: After l rounds of negotiation, where $0<l\le k$, the outcome can either be an agreement or a disagreement. Agreement: An agreement means that both users agree to the negotiated terms of mutual information access as defined in the last exchanged message $M_l$. Without loss of generality, in the following we assume that v has sent the l-th message to u. The conditions for an agreement are:

$Rs_l \ge Rq_{l-1}$, i.e., v responds to u's request from round l-1 in such a way that u gets a least what he asked for (indicated by o) and $Rs_{l-1} \ge Rq_l$ or $Rs_{l-1} \ge Rq_{l-2} = Rq_l$, i.e., u's offer in round l-1 is better or equal to what v has asked for in l-2 or what v can accept in round l.

The simplest implementation of these conditions is that the respective sets and sets induced by queries must be the same, i.e., $\ge$ is interpreted as set equality $=$. While this is a working embodiment of the techniques described herein, many alternative implementations are conceivable. For example, in situations where users are negotiating read access for a set of attributes described by a set of ontology types, a round l of a negotiation would be accepted as an agreement if u and v would be willing to let each other access at least all those attribute values for whose access they asked for and which they actually have. Note that this interpretation of $\ge$ is more flexible than $=$ because u and v do not know in advance what attribute types the other user actually maintains. Furthermore, they may offer to share more attributes than the other user asked for. That is, a relation for comparing request and response portions of the messages is defined such that a tuple comprising a response portion and a request portion are contained in the relation such that the response portion constitutes an offer which is at least favorable to the user u or the user v from which the request portion originates in terms of at least one of ontology types, policies, contacts, credentials, conditions, and obligations as the request portion where the comparison is performed by a comparison function which receives the response and request portions to be compared as input and returns a binary output.

Disagreement. A negotiation ends in a disagreement if:
after k rounds, the above conditions have not been met,
at any step $l\le k$, at least one of the users decides to explicitly terminate the negotiation, or at any step l≤k the negotiation is terminated implicitly because of a pre-defined timeout set by the ESN or agreed upon between the negotiating parties.

In case of a disagreement, there are two possible next steps: 1. Based on mutual consent a de-escalation reverts the last j steps of the negotiation, where 0<j<l, and the negotiating parties re-enter another j rounds of negotiation; this means that no resulting actions executed yet. 2. The negotiation ends, no new mutual information access is granted, and the set of resulting actions as defined in the last round of the negotiation is executed.

De-escalation: Considering a typical negotiation between two users and the negotiation being controlled by the users to a large extent, the to-be-released profile information can quickly become much larger than initially intended by the users. For this probable situation, the system provides a de-escalation facility that is implemented in case a massive exchange of profile information is detected in a negotiation. The detection can, for example, be based on a defined threshold, predefined user preferences, or be in relation to the initially requested profile data items. The facility suggests to the involved user, either one of both, to revert to a previous stage in the negotiation process or to drastically reduce the number of profile items to be released. Reverting to the state of a previous negotiation round is achieved by storing all exchanged negotiation messages in an appropriate data structure. Automatically suggesting a suitable set of data types, respective policies, queries, conditions, obligations, and compensation actions to which both parties are likely to agree is more difficult and requires more sophisticated techniques. One solution to this problem is to refer to a formal model of empiric user negotiation strategies and compute a useful negotiation outcome or intermediate stage based on the model.

After a negotiated agreement, v and u may access each other's profile information according to the terms of their agreement. Furthermore, profile information, contact details, and credentials will be exchanged as agreed in the negotiation. The negotiating parties are bound by the negotiated obligations. In case one of them fails to fulfill an obligation as negotiated, a predefined compensation action will be triggered. In a typical implementation, the exchange of profile information would be done after both users have consented at the final outcome of the negotiation. The actual mechanism used is dependent on the specific ESN under consideration. A typical mechanism is to change the access control function or the mutual access control policies according to the negotiated agreement.

As an alternative to the above-described approach, where the negotiation and the information access are strictly separated, an interleaved is conceivable. Here, each negotiation step would be followed by mutual release of data as previously agreed. More precisely, users would agree to reveal parts of the negotiated profile data items step by step and subsequently carry on with the negotiation.

The methods described herein can be generalized to work on not only directly with ontology types, access control policies, and usage control policies as described above, but also with general attribute statements. This helps to implement the data minimization principle to a greater extent and thus improving on data privacy by reducing the amount of released information to what is necessary. For many use cases it is not necessary to have a value of an attribute, but a statement on the attribute suffices. An attribute statement comprises predicates on attributes and constants. Examples for predicates are the arithmetic comparison operators such as $<$, $\leq$, $>$, $\geq$, but the methods described herein are not restricted to those. For example, instead of revealing the yearly salary attribute of a user by giving its value, a statement like yearly salary $\geq 100000$ or a range can be given. This is sufficient for many scenarios. Note that the special cases of ranges for real numbers are known mechanisms in ESNs.

There are multiple ways of releasing data items to another party. Typically, the type of release is governed in an access or usage control policy that accompanies the ontology type or contact query in question.

Plaintext. Releasing a data item as plaintext means that the intended recipient will receive the data item in plain form. This is the standard technique for how information is released in today's ESNs.

DRM-protected. Releasing a data item in a DRM-protected way gives further possibilities for protection of this data item. Any kind of DRM protection that is technically possible can be applied. For example, a phone number can be released to the DRM-enabled mobile phone of the recipient and allow the recipient to make at most one successful phone call to this number without revealing the number to the recipient user in readable form.

Associating a credential query with a dedicated policy allows for conditionally releasing data items. This means that the releasing party may impose a set of conditions on the retrieval and usage of some data item. For example, in a scenario when a user wants to release his mobile phone number for use by the recipient in urgent cases but if DRM-protected release is not supported by the system, conditional release can be applied. The releasing user can specify a release condition that only in urgent or emergency cases the phone number may be retrieved for the purpose of calling for this urgent matter or emergency and define remedies in case this is violated. If the recipient agrees to this kind of release and accepts the remedies and the applied conflict resolution mechanism, the recipient will not yet receive any information but is ensured that he will be able to retrieve the phone number in case of an urgent or emergency situation. The recipient needs to state that an urgent situation has arisen in order to retrieve the phone number.

The conditions for retrieval can be checked by the ESN as a trusted party and usage conditions are either enforced by the recipient system or communicated to the recipient user. It is possible to define remedies in case the recipient misuses the data or illegitimate retrieval.

Generally speaking, the methods described in connection with FIGS. 1, 2A and 2B allow ESN users to negotiate interactively and in a mutually reciprocal manner to specify an amount of profile information they want to share as well as one or more conditions under which the information may be shared. These methods also allow ESN users to negotiate interactively and in a mutually reciprocal manner to specify one or more types or categories of profile information they want to share and under what conditions these one or more categories may be shared. By implementing a more user-controllable and more realistic way of exchanging real-world information relative to prior art techniques, the methods disclosed herein increase the value of ESNs for both users and operators.

Figure 3:
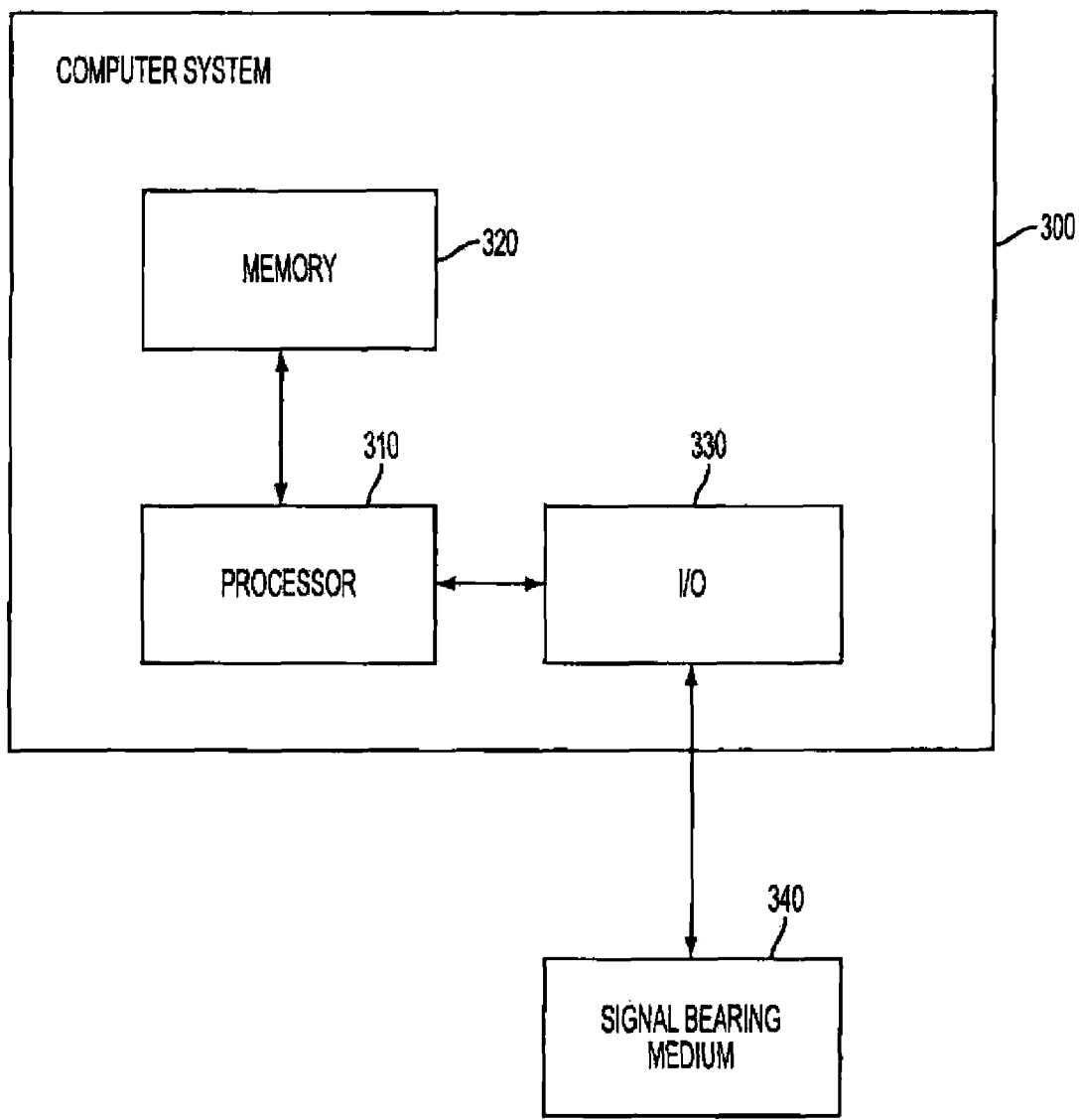
FIG. 3 sets forth an illustrative computer program product or hardware product for implementing an electronically based negotiation session between a first user and a second user to provide information access in an ESN.

FIG. 3 sets forth an illustrative computer program product or hardware product for implementing an electronically based negotiation session between a first user and a second user to provide information access in an ESN. The system includes a computer 300 (i.e., a server) operatively coupled to a signal bearing medium 340 via an input/output interface (I/O) 330. The signal bearing medium 340 may include a representation of instructions for implementing an electronically based negotiation session between a first user and a second user to provide information access in an ESN, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc. From respective computing devices, (e.g., personal computers), the first and second users communicatively connect to the computer 300. The computer 300, after successful negotiation, makes new profile information accessible to the users as agreed in the session.

The computer 300 includes a processor 310 that processes information for implementing an electronically based negotiation session between a first user and a second user to provide information access in an ESN, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program for implementing an electronically based negotiation session between a first user and a second user to provide information access in an ESN. The session includes a series of k successive rounds, k being a positive integer greater than one. The processor 310 implements instructions for sending a first message including a request portion from a first user via the first user's computing device to a second user at the second user's computing device, in a first round; in response to receiving the request portion of the first message, sending a second message from the second user to the first user in a second round, the second message including a response portion responsive to the request portion of the first message, the second message also including a request portion; performing a test to ascertain whether or not any agreement exists between the request portion of the first message and the response portion of the second message and, if any agreement exists, terminating the negotiation session; terminating the negotiation session in response to receiving a signal indicative of a desire to terminate the session from at least one of the first user or the second user; if any rounds of the k successive rounds remain, exchanging one or more subsequent messages by commencing with a subsequent message being sent in a direction opposite that of an immediately preceding message wherein, if the immediately preceding message was sent from the first user to the second user, then the subsequent message is sent from the second user to the first user and, if the immediately preceding message was sent from the second user to the first user, then the subsequent message is sent from the first user to the second user, and continuing to successively send one or more additional subsequent messages if at least one round of the k successive rounds remain, and if an agreement has not been identified as existing, and if a signal has not been received indicative of a desire to terminate the session from at least one of the first user or the second user, whereupon if an agreement has been identified as existing or no round of the k successive rounds remain, or if the signal is received indicative of a desire to terminate the session, then terminating the session. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for exchanging negotiated profile information in accordance with an electronically based multi-round negotiation session for improving data privacy by reducing an amount of exchanged information, the electronically based multi-round negotiation session between computing devices in an electronic social network, the computer-executable method comprising:

implementing, by the computing devices, an initial round of a series of successive rounds within the electronically based multi-round negotiation session between first and second user profiles stored on the computing devices, the initial round includes providing an initial message by a first computer of the computing devices to a second computer of the computing devices, the initial message specifying an initial contact set;

implementing, by the computing devices, a subsequent round of the series of successive rounds within the electronically based multi-round negotiation session, the subsequent round comprising:

receiving a first subsequent message in response to the initial round from the second computer by the first computer, de-escalating the electronically based multi-round negotiation session by modifying the initial contact set of the initial message to a reduced contact set of a modified initial message, and providing the modified initial message as a response to the first subsequent message by the first computer to the second computer;

determining after the subsequent round that the modified initial message satisfies a termination condition by comparing the reduced contact set to a second subsequent message received from the second computer, the termination condition being an agreement between the reduced content set and a content of second subsequent message;

exchanging the negotiated profile information between the first and second users in response to the termination condition being determined as satisfied, the negotiated profile information being in accordance with the agreement; and terminating the electronically based multi-round negotiation session in response to the exchanging of the negotiated profile information, the terminating of the electronically based multi-round negotiation session includes executing actions and setting policies as negotiated during the electronically based multi-round negotiation session with respect to the agreement.

2. The method of claim 1, wherein the content of each message includes a request portion and a response portion, the request portion specifying the set of contacts as required by the first user or the second user, and the response portion of the message including the set of contacts that the other of the first user or second user agrees to satisfy.

3. The method of claim 1, wherein the content of each message includes a query, the query specifying the set of contacts that are requested by the user corresponding to that message from the other of the user.

4. The method of claim 1, wherein the content of each message includes a plurality of queries, each query corresponding to a set of ontology types, a set of policies, the set of contacts, a set of credentials, a set of conditions, a set of obligations, or a set of resulting actions.

5. A system for exchanging negotiated profile information in accordance with an electronically based multi-round negotiation session for improving data privacy by reducing an amount of exchanged information, comprising a first computer that includes a processor and a memory, configured to:

implement an initial round of a series of successive rounds within the electronically based multi-round negotiation session between first and second user profiles of an electronic social network, wherein the initial round includes an initial message provided by the first user profile stored on the first computer to the second user profile stored on a second computer of the electronic social network, the initial message specifying an initial contact set;

implement a subsequent round of the series of successive rounds within the electronically based multi-round negotiation session, wherein the subsequent round comprises:

a first subsequent message received in response to the initial round from the second computer by the first computer, a de-escalation of the electronically based multi-round negotiation session by modifying the initial contact set of the initial message to a reduced contact set of a modified initial message, and the modified initial message provided as a response to the first subsequent message by the first computer to the second computer;

determining after the subsequent round that the modified initial message satisfies a termination condition by comparing the reduced contact set to a second subsequent message received from the second computer, the termination condition being an agreement between the reduced content set and a content of second subsequent message;

exchange the negotiated profile information between the first and second users in response to the termination condition being determined as satisfied, wherein the negotiated profile information is in accordance with the agreement; and terminate the electronically based multi-round negotiation session in response to the exchange of the negotiated profile information, wherein the terminating of the electronically based multi-round negotiation session includes an execution actions and setting policies as negotiated during the electronically based multi-round negotiation session with respect to the agreement, wherein the content of each message includes a request portion and a response portion, the request portion specifying the set of contacts as required by the first user or the second user, and the response portion of the message including a reduced set of contacts that the other of the first user or second user agrees to satisfy.

6. The system of claim 5, wherein the content of each message includes a request portion and a response portion, wherein the request portion specifies the set of contacts as required by the first user or the second user, and wherein the response portion of the message includes the set of contacts that the other of the first user or second user agrees to satisfy.

7. The system of claim 5, wherein the content of each message includes a query, and wherein the query specifies the set of contacts that are requested by the user corresponding to that message from the other of the user.

8. The system of claim 5, wherein the content of each message includes a plurality of queries, wherein each query corresponds to a set of ontology types, a set of policies, the set of contacts, a set of credentials, a set of conditions, a set of obligations, or a set of resulting actions.

9. A computer program product, the computer program product comprising a non-transitory computer readable storage medium having program instructions for exchanging negotiated profile information in accordance with an electronically based multi-round negotiation session for improving data privacy by reducing an amount of exchanged information embodied therewith, the program instructions executable by a processor to cause:

implementing an initial round of a series of successive rounds within the electronically based multi-round negotiation session between first and second user profiles of an electronic social network, the initial round includes providing an initial message by the first profile of to the second profile;

implementing a subsequent round of the series of successive rounds within the electronically based multi-round negotiation session, the subsequent round comprising:

receiving a subsequent message in response to the initial round from the second computer by the first computer, de-escalating the electronically based multi-round negotiation session by modifying the initial contact set of the initial message to a reduced contact set of a modified initial message, and providing the modified initial message as a response to the first subsequent message by the first computer to the second computer;

determining after the subsequent round that the modified initial message satisfies a termination condition by comparing the reduced contact set to a second subsequent message received from the second computer, the termination condition being an agreement between the reduced content set and a content of second subsequent message;

exchanging the negotiated profile information data between the first and second users in response to the termination condition being determined as satisfied, the negotiated profile information being in accordance with the agreement; and terminating the electronically based multi-round negotiation session in response to the exchanging of the negotiated profile information, the terminating of the electronically based multi-round negotiation session includes executing actions and setting policies as negotiated during the electronically based multi-round negotiation session with respect to the agreement, wherein the content of each message includes a request portion and a response portion, the request portion specifying the set of contacts as required by the first user or the second user, and the response portion of the message including a reduced set of contacts that the other of the first user or second user agrees to satisfy.

10. The computer program product of claim 9, wherein the content of each message includes a request portion and a response portion, wherein the request portion specifies the set of contacts as required by the first user or the second user, and wherein the response portion of the message includes the set of contacts that the other of the first user or second user agrees to satisfy.

11. The computer program product of claim 9, wherein the content of each message includes a query, and wherein the query specifies the set of contacts that are requested by the user corresponding to that message from the other of the user.

12. The computer program product of claim 9, wherein the content of each message includes a plurality of queries, wherein each query corresponds to a set of ontology types, a set of policies, the set of contacts, a set of credentials, a set of conditions, a set of obligations, or a set of resulting actions.

* * * * *